United States Patent
Kim et al.

(10) Patent No.: US 7,214,911 B2
(45) Date of Patent: May 8, 2007

(54) FOGGING DETECTING SYSTEM FOR AN AUTOMOTIVE VEHICLE AND METHOD FOR CONTROLLING THE SYSTEM

(75) Inventors: Young-Kil Kim, Seoul (KR); Sae-Won Oh, Seoul (KR); Jeong-Hoon Lee, Seoul (KR); Tae-Hwan Yu, Seoul (KR)

(73) Assignee: Halla Climate Control Corporation, Daejeon-si (KR)

( * ) Notice: Subject to any disclaimer, the term of this patent is extended or adjusted under 35 U.S.C. 154(b) by 0 days.

(21) Appl. No.: 11/383,864

(22) Filed: May 17, 2006

(65) Prior Publication Data
US 2006/0289458 A1    Dec. 28, 2006

(30) Foreign Application Priority Data
May 17, 2005   (KR) .................. 10-2005-0040969

(51) Int. Cl.
   *H05B 1/02*   (2006.01)
(52) U.S. Cl. .................. 219/497; 219/203; 219/494; 219/492
(58) Field of Classification Search ........ 219/202–206, 219/494, 497, 499, 501, 492, 505, 507, 508
   See application file for complete search history.

(56) References Cited

U.S. PATENT DOCUMENTS

| 6,422,062 | B1 | 7/2002 | King et al. |
| 6,862,893 | B1* | 3/2005 | Wang .................. 62/176.6 |
| 7,028,531 | B2* | 4/2006 | Nikolaus .............. 73/29.05 |
| 2006/0004494 | A1* | 1/2006 | Errington ............... 701/1 |

* cited by examiner

*Primary Examiner*—Mark Paschall
(74) *Attorney, Agent, or Firm*—Lowe, Hauptman, & Berner, LLP

(57) ABSTRACT

A car defogging system reduces energy required to defog a windshield glass of the car. A temperature sensor mounted at the windshield glass detects the glass surface temperature, Ts. A humidity sensor spaced from the windshield glass by a predetermined distance detects the humidity, H, around the windshield glass. A temperature sensor mounted inside the windshield glass detects peripheral temperature Te around the glass. A system controller determines if fog is or is not present by comparing the dew point temperature Td with the surface temperature Ts. Dew point temperature Td is derived by the combining values of H and a temperature Tc based on a combination of Ts and Te.

19 Claims, 7 Drawing Sheets

FOGGING DETECTING SYSTEM FOR AN AUTOMOTIVE VEHICLE AND METHOD FOR CONTROLLING THE SYSTEM

RELATED APPLICATIONS

The present application is based on, and claims priority from Korean Application Number 10-2005-040969, filed May 17, 2005, the disclosure of which is hereby incorporated by reference herein in its entirety.

BACKGROUND OF THE INVENTION

1. Field of the Invention

The invention relates to a fogging detecting system for an automotive vehicle and a method for controlling the system, which is adapted to be able to secure the view of a driver by removing the fog formed on a wind shield glass of the automotive vehicle, more in particular, to a defogging system for an automotive vehicle and a method for controlling the same, which can prevent the excessive loss of power by expecting the time when the fog will occur approximately to the actual condition in consideration of the temperature distribution around the wind shield glass.

2. Background of the Related Art

In general, a fogging phenomenon of forming dewdrops at the wind shield glass is produced when the humidity at the inside of the automotive vehicle is high and exterior temperature is low. In other words, as shown in FIG. 1, fog is produced when the surface temperature Ts of the wind shield glass is lower than the dew point temperature Td determined by the humidity around the wind shield glass, to thereby veil the view of the driver. Accordingly, most of the automotive vehicles are provided with the defogging system for removing the fog by using air discharged through a defrost duct of an air conditioning system at the time of the occurrence of the fog.

The defogging system not only accomplishes the safety of the driver by securing good view of the driver but improves the pleasant atmosphere, by early detecting the occurrence of the fog at the wind shield glass to thereby suppress the occurrence of the fog and remove it early. Accordingly, most of the defogging system detects the occurrence of the fog by using a fog sensor mounted to the wind shield glass, and if the occurrence of the fog is expected, the defogging system is operated to suppress the occurrence of the fog and remove the fog occurred previously.

The fog sensor is comprised of a temperature sensor for detecting the surface temperature of the wind shield glass and a humidity sensor for detecting the humidity around the wind shield glass, and obtains the dew point temperature by using the function of the temperature and the humidity. Accordingly, the accuracy of the fog sensor is determined by how accurately it expects the dew point temperature, and is designed in various shapes to obtain the optimum dew point temperature.

As a result, it is most important to calculate the dew point temperature to expect the occurrence of the fog accurately. However, most of the fog sensors calculate the dew point temperature only on the basis of the surface temperature of the wind shield glass, or only on the basis of the peripheral temperature of the wind shield glass, so that the accuracy of the calculation of the dew point temperature is doubted.

FIG. 9 shows a graph expecting the occurrence of the fog on the basis of the surface temperature of the wind shield glass or the peripheral temperature. In this regard, a deviation between the dew point temperature and the surface temperature of the glass, which varies along with the lapse of time, are shown, after the dew point temperature is calculated on the basis of the surface temperature of the glass or the peripheral temperature of the glass.

As a result of the expectation of the time when the fog is occurred on the basis of the surface temperature of the glass, it is expected that the fog will be occurred at about nine minutes after the start up of the automotive vehicle. However, the fog was actually occurred at twenty seven minutes after the start up of the automotive vehicle, so there was a difference of about eighteen minutes. That is, the defogging system was operated at about eighteen minutes faster than the time actually required, to thereby dissipate the energy.

Further, as a result of the expectation of the time of the fog occurrence on the basis of the peripheral temperature, it is expected that the fog will occur at about seven minutes after the start up of the automotive vehicle. However, the fog was actually occurred at about twenty seven minutes after the start up, to thereby produce a difference of about twenty minutes. That is, the defogging system was operated at about twenty seven minutes faster than the time actually required, to thereby dissipate the energy.

After all, it is an important point to calculate the dew point temperature more accurately to reduce the consumption of the energy. Accordingly, several methods have been devised to calculate the accurate dew point temperature, and the following US patent discloses one of those methods.

With regard to a fog sensor unit disclosed in U.S. Pat. No. 6,422,062B1, it comprises in a protection dome a glass temperature sensor mounted to the wind shield glass, an air temperature sensor for sensing the temperature of the air, which is positioned a predetermined distance apart from the wind shield glass, and a humidity sensor for sensing the humidity of the air, whose temperature is sensed by the air temperature sensor.

The fog sensor unit determines whether there occurs a fog or not by comparing the glass temperature sensed by the glass temperature sensor with the dew point temperature, after confirming the dew point temperature of a position isolated a predetermined distance from the wind shield glass by sensing the temperature and the humidity of the position by using the air temperature sensor and the humidity sensor.

However, the fog sensor unit calculates the dew point temperature by measuring the temperature with the air temperature sensor only, and the glass temperature sensed by the glass temperature sensor is not used in the calculation of the dew point temperature. Accordingly, it is impossible to know the temperature distribution depending on the air conditioning and the state of the vehicle, so that the accuracy and the responsive property were decreased at the time of expecting the occurrence of the fog, when the fluctuation of the temperature is serious due to outer disturbances such as the air fluctuation at the inside of the vehicle, and the like.

SUMMARY OF THE INVENTION

Therefore, the present invention has been made in view of the above problems occurring in the prior art, and it is an object of the present invention to provide a defogging system and a method for controlling the same, which can prevent the decrease of the fuel efficiency due to the operation of the defogging system, by calculating the dew point temperature through estimating the volume of the peripheral vapor more accurately based on the temperature fluctuation of the wind shield glass at first, and then expecting the time of the occurrence of the fog to be closer to the actual time of the occurrence of the fog to thereby prevent the unnecessary operation of the defogging system.

Another object of the present invention is to provide a defogging system and a method for controlling the same, which can control the defogging of the vehicle more advantageously in comparison with the prior method of calculating the dew point temperature without the compensation of the outer disturbances such as the temperature distribution in the vicinity of the wind shield glass, an atmospheric current, and temperature difference between the indoor and the outdoor, and the like, by calculating the dew point temperature by using a combination temperature obtained in consideration of the temperature distribution in the vicinity of the wind shield glass.

To achieve the above objects of the present invention, there is provided a defogging system for an automotive vehicle comprising a surface temperature sensor mounted at a wind shield glass of an automotive vehicle for detecting the surface temperature of the glass, a humidity sensor mounted at a position spaced apart from the wind shield glass by a predetermined distance for detecting the humidity around the wind shield glass, a peripheral temperature sensor mounted biasedly at the inside from the wind shield glass for detecting the peripheral temperature around the glass, and a controller for controlling a system by determining if the fog is occurred or not through comparing the dew point temperature with the surface temperature, after obtaining a dew point temperature by using a combination temperature and the humidity determined based on the temperature combination of the surface temperature sensor and the peripheral temperature sensor.

Further, according to the defogging system for the automotive vehicle of the present invention, the peripheral temperature sensor is mounted at the outside of a boundary layer affecting the occurrence of the fog directly when the fogging is occurred at the wind shield glass, and the surface temperature sensor can comprise a protection cover made of insulation material for enveloping itself to exclude the effect of the indoor temperature of the automotive vehicle.

Also, according to the defogging system for the automotive vehicle of the present invention, the humidity sensor is mounted at a position spaced apart by 0.5~10 mm from a surface of the wind shield glass, and it can be constructed to be enveloped by a vent cover formed with a plurality of holes.

In addition, according to the defogging system for the automotive vehicle of the present invention, the surface temperature sensor, the humidity sensor, and the peripheral temperature sensor can be built in a single case mounted at a predetermined place of an inner surface of the wind shield glass, and mounted at a single PCB (printed circuit board) so that they can be connected to the controller, and the surface temperature sensor is mounted close to a silicon pad attached to a glass surface of the wind shield glass.

Also, according to a method for controlling a defogging system for an automotive vehicle of the present invention, it comprises a first step of detecting a surface temperature Ts of a wind shield glass and a peripheral temperature Te of a position spaced apart a predetermined distance from the wind shield glass, a second step of detecting a humidity H of the wind shield glass by using a humidity sensor mounted close to the wind shield glass, a third step of setting a combination temperature Tc by combining the surface temperature Ts obtained at the first step and the peripheral temperature Te, a fourth step of calculating a dew point temperature Td on the basis of the humidity H obtained at the second step and the combination temperature Tc obtained at the third step; and a fifth step of operating the defogging system if the surface temperature Ts is lower than the dew point temperature Td, and if not, stopping the operation of the defogging system, after comparing the surface temperature Ts with the dew point temperature Td.

Further, according to the method for controlling a defogging system for an automotive vehicle of the present invention, the combination temperature Tc of the third step is set by the following equation with giving weighted values (x;0<x<1) to the surface temperature Ts and the peripheral temperature Te according to the driving condition and the air conditioning condition of the automotive vehicle: $Tc=xTs+(1-x)Te$.

In addition, according to the method for controlling a defogging system for an automotive vehicle of the present invention, the weighted value is determined by at least one air conditioning factors such as speed of the automotive vehicle, air quantity of a blower, discharging mode of an air conditioner, temperature difference between the indoor and the outdoor of the automotive vehicle, and the like, and it is preferable to be determined by the mean value of the weighted values determined through the whole air conditioning factors.

Also, according to the method for controlling a defogging system for an automotive vehicle of the present invention, the defogging system is operated if the deviation between the dew point temperature Td and the surface temperature Ts is above a predetermined value, and if not, the operation of the defogging system is stopped, in the fifth step.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
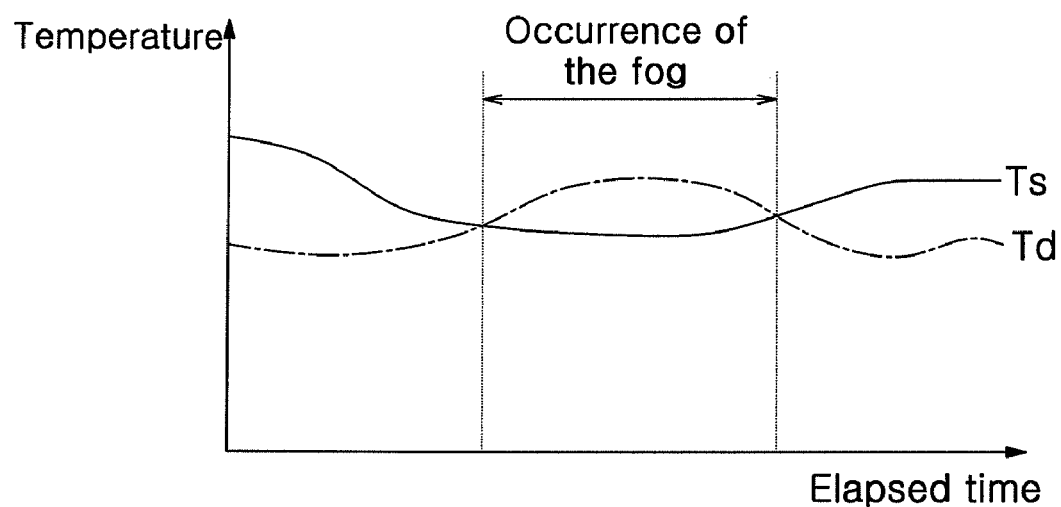
FIG. 1 is a graphic view showing the occurrence of the fog according to the temperature of the wind shield glass.
Figure 2:
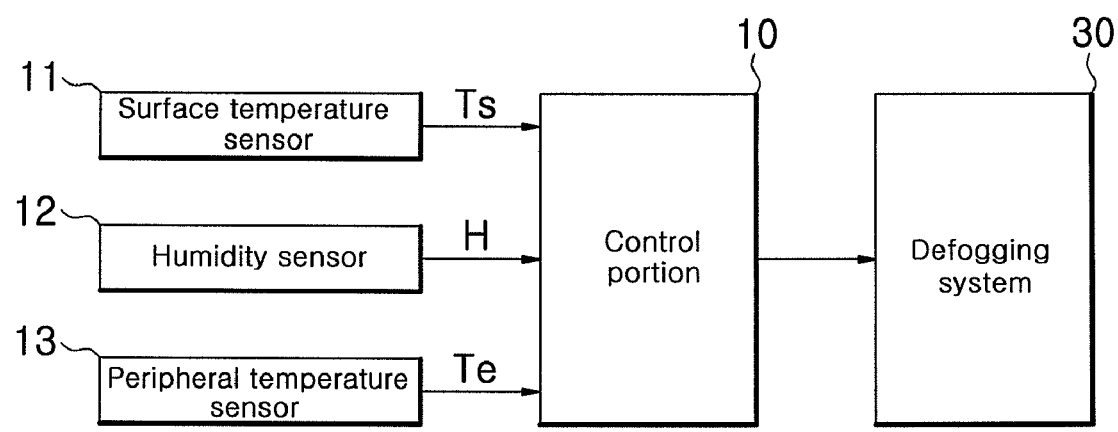
FIG. 2 is a block diagram of a defogging system for an automotive vehicle according to one embodiment of the present invention.
Figure 3:
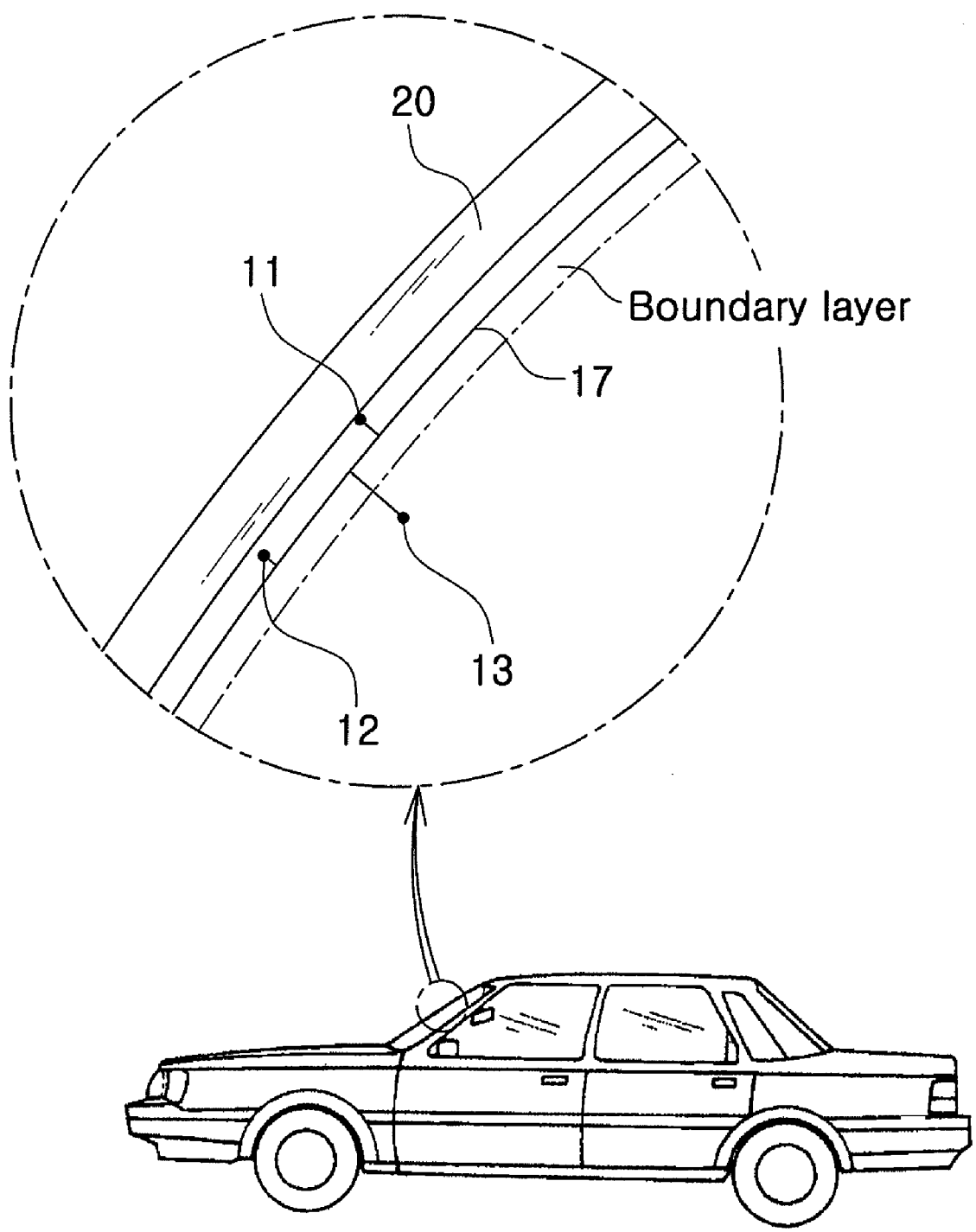
FIG. 3 is a view showing the installation positions of the sensors of the system of FIG. 2.
Figure 4:
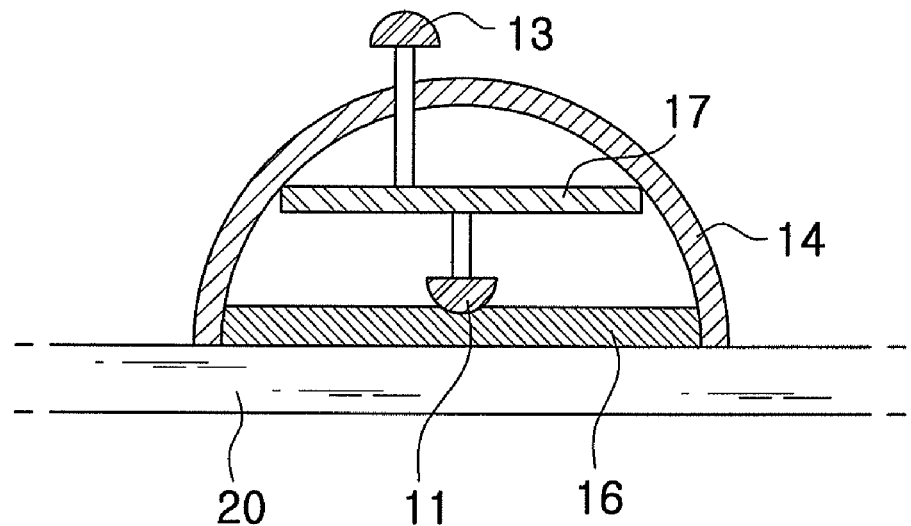
FIG. 4 is a conceptual view useful for explaining the installation of the temperature sensors of the system of FIG. 2.
Figure 5:
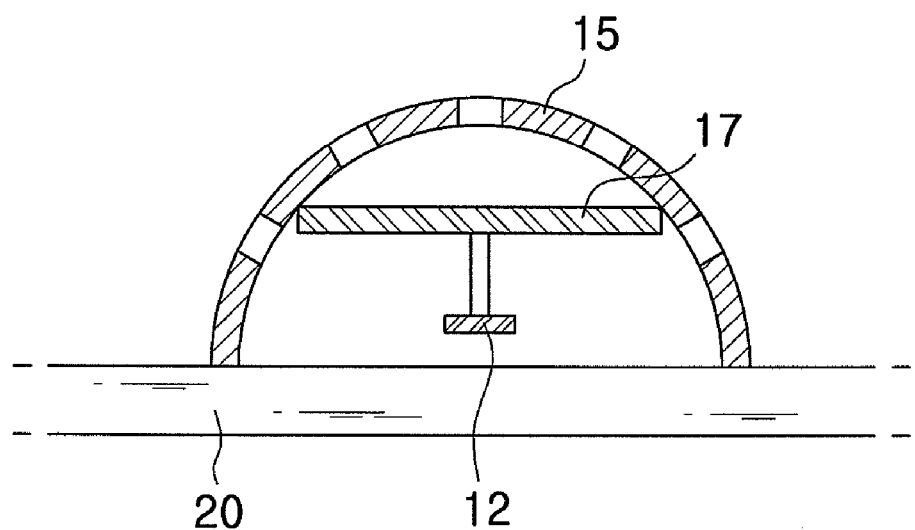
FIG. 5 is a conceptual view useful for explaining the installation of the humidity sensors of the system of FIG. 2.

Reference will now be made in detail to the preferred embodiment of the present invention with reference to the attached drawings.

The terms and words used in the description of the present invention should be construed as meanings and concepts conforming to the technical spirit of the present invention based on the principle that the inventor can define the concept of the term appropriately to explain his invention in best way.

The automotive vehicle defogging of FIGS. 2–8 comprises a surface temperature sensor 11 mounted at a wind shield glass 20 of an automotive vehicle for detecting the surface temperature Ts of the glass, a humidity sensor 12 mounted at a position spaced from the wind shield glass 20 by a predetermined distance for detecting the humidity H around the wind shield glass 20, a peripheral temperature sensor 13 mounted biasedly at the inside from the wind shield glass 20 for detecting the peripheral temperature Te around the glass, and a controller 10 for controlling a system 30 by determining if the fog is present or not by comparing the dew point temperature Td with the surface temperature Ts, after obtaining a dew point temperature Td by using the humidity H and a temperature Tc determined based on the temperature combination of the surface temperature sensor 11 and the peripheral temperature sensor 13.

The peripheral temperature sensor 13 is mounted at the outer side of the boundary layer which affects the occurrence of the fog directly when fog is on the wind shield glass. It is preferable for sensor 13 to be mounted within 4~15 mm from the indoor surface of the wind shield glass. In this instance, a protective cover 14 made of thermal insulation material is mounted around the surface temperature sensor 11 to thereby exclude the effect of the indoor temperature of the vehicle.

Further, the humidity sensor 12 is mounted at a position spaced by 0.5~10 mm from the wind shield glass 20. It is preferable for the humidity sensor to be covered with a vent cover 15 having a plurality of penetration holes. The humidity sensor 12 is isolated from the wind shield glass 20 by 0.5~10 mm to settle the problem of ventilation property and measure the humidity more accurately.

Figure 6:
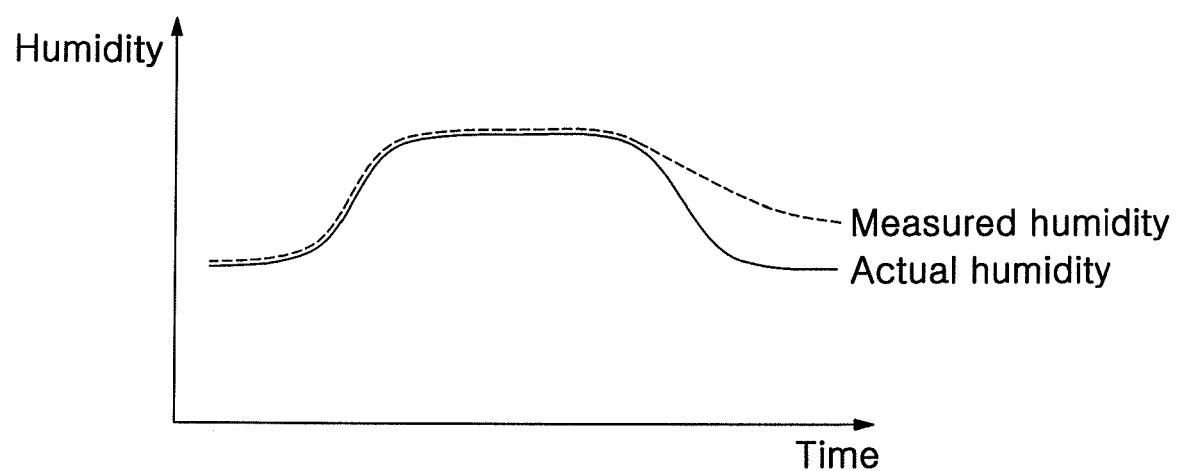
FIG. 6 is a graph indicating change of humidity when the humidity sensor is installed close to the wind shield glass.

That is, as shown in FIG. 6, if the humidity sensor 12 were mounted too close to the surface of the wind shield glass or venting were not achieved, moisture is stagnated and be vaporized late at the time of the dehumidification, so that the accuracy of measuring the humidity decreases. Also, if the humidity sensor 12 is mounted too far from the wind shield glass 20, it is impossible to achieve the original object of measuring the humidity in the vicinity of the surface of the wind shield glass 20.

Figure 7:
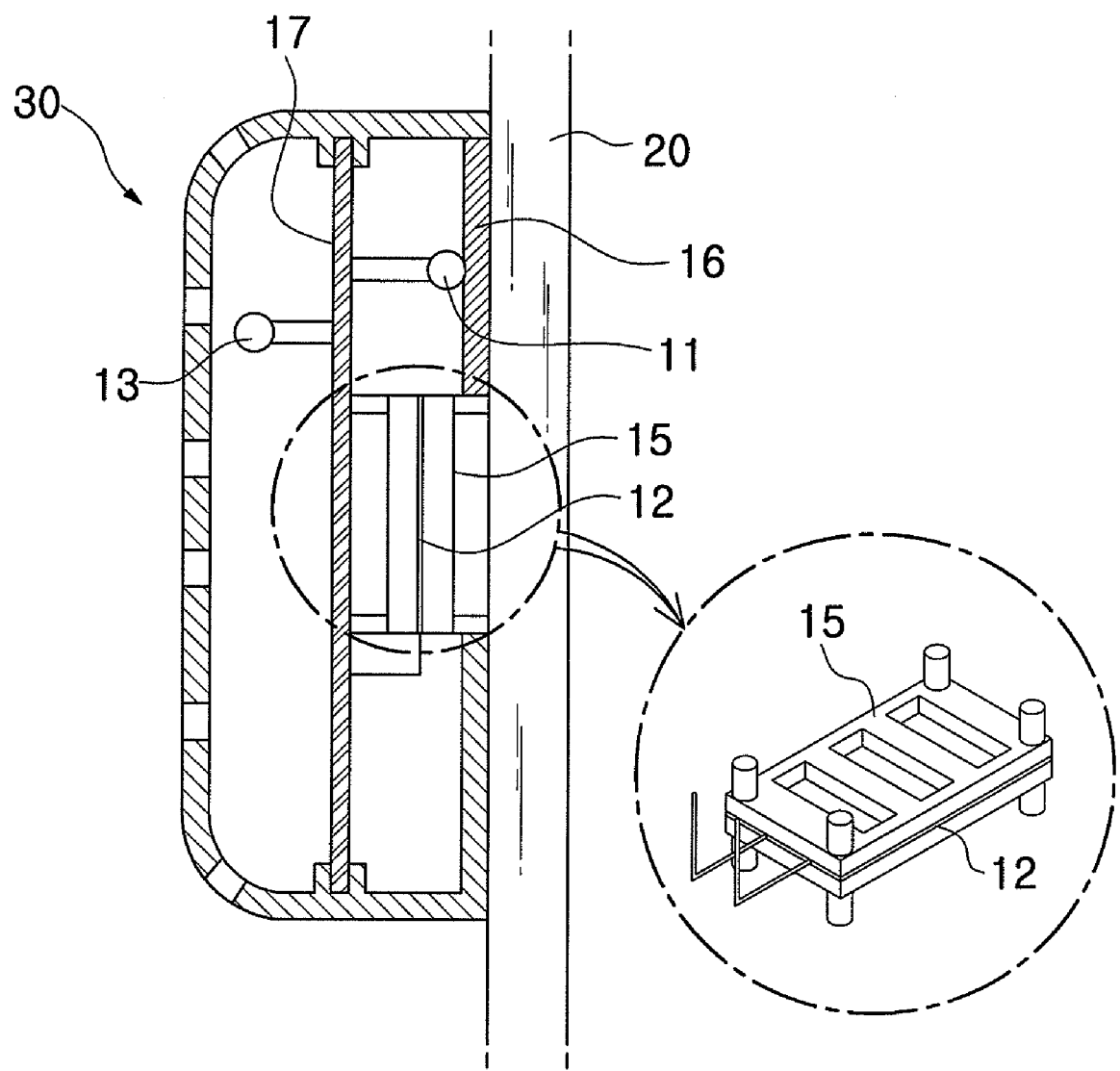
FIG. 7 is a side sectional view of the defogging system of FIG. 2.
Figure 8:
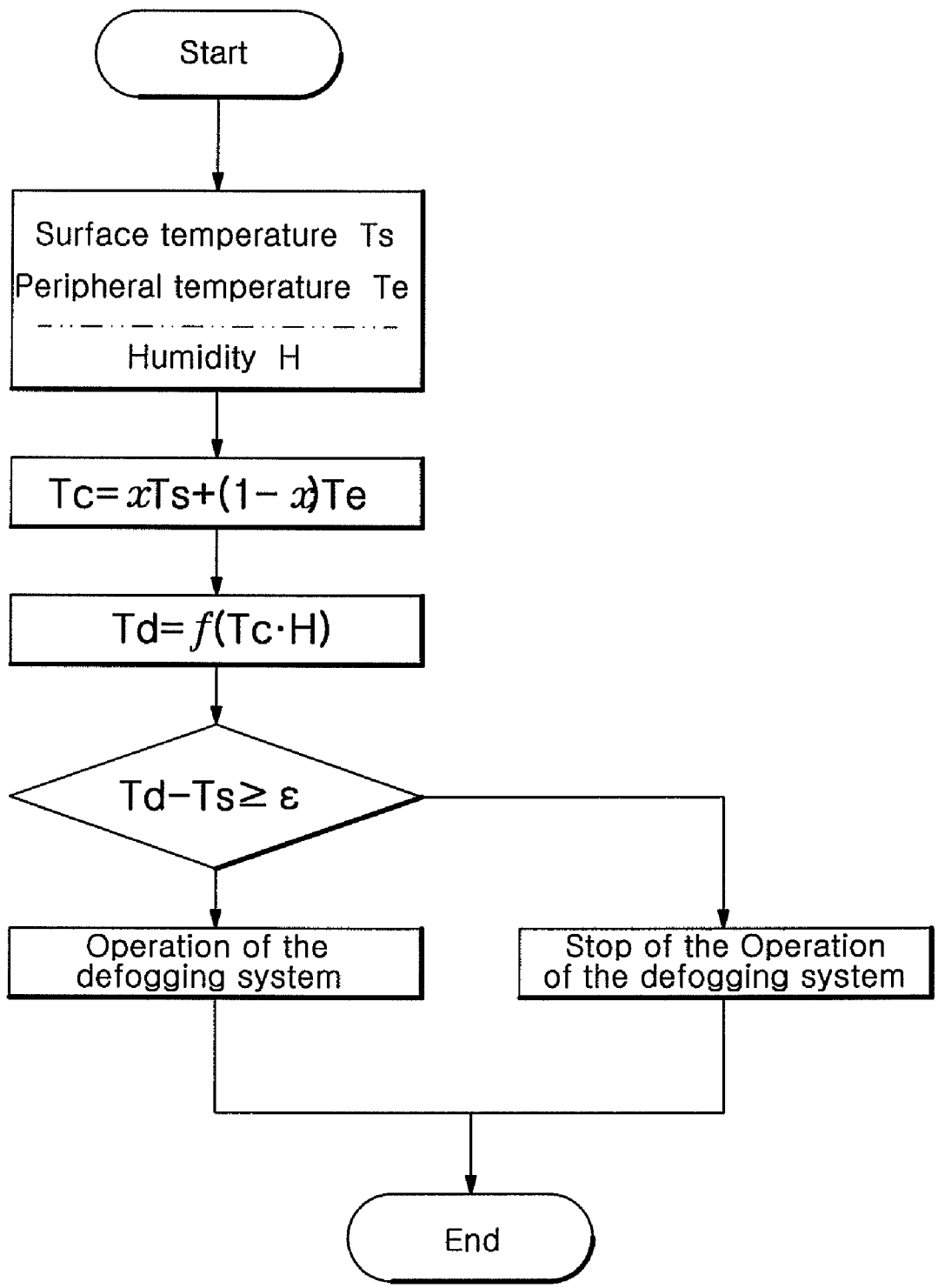
FIG. 8 is a flow chart of control of operations of the system of FIG. 2.

Further, as shown in FIG. 7, the surface temperature sensor 11, the humidity sensor 12, and the peripheral temperature sensor 13 are mounted in a single case 40 attached to a predetermined place on the interior surface of the wind shield glass, and the surface temperature sensor 11, the humidity sensor 12, and the peripheral temperature sensor 13 are mounted on a single printed circuit board (PCB) 17 so that they can be connected to the controller 10, and it is preferable for the surface temperature sensor 11 to be mounted to closely contact a silicon pad 16 attached to the glass surface of the wind shield glass 20.

The silicon pad 16 is used because it is difficult to maintain the attachment state of the surface temperature sensor 11 mounted to the wind shield glass 20. Pad 16 makes it possible to measure the surface temperature Ts of the wind shield glass 20 more accurately because the thermal conductivity of the silicon pad 16 is excellent. Preferably humidity sensor 12 is configured as a film so sensor 12 can be located at a position spaced from the glass surface by using a vent cover 15 with plural holes.

The defogging system described above is controlled as follows.

The surface temperature Ts of the wind shield glass 20, and the peripheral temperature Te, which is the temperature of the air at a position spaced a predetermined distance from the wind shield glass 20, are detected. The humidity H in the vicinity of the wind shield glass is detected by using the humidity sensor 12 mounted close to the wind shield glass. The combined temperature Tc is obtained by combining the surface temperature Ts and the peripheral temperature Te.

The combined temperature Tc is obtained by using the surface temperature Ts and the peripheral temperature Te. Tc is preferably calculated by using the following equation 1.

$$Tc = xTs + (1-x)Te \quad (1),$$

Where x is a weighted value, which is determined according to the driving condition of the automotive vehicle, and falls in the range of $0 < x < 1$.

Further, the weighted value x is determined by at least one factor selected from the speed of the automotive vehicle, the air quantity of the blower, the discharging mode of the air conditioner, and the temperature difference between the automotive vehicle interior and exterior.

The weighted value x has different values according to the speed of the automotive vehicle, and increases as the automotive vehicle speed increases. This is because x is affected by the outside air for high speed driving of the automotive vehicle, so that the air state of the boundary layer of the glass surface becomes the air state of the glass surface side.

The weighted value x has different values according to the air quantity of the blower, and decreases as the rotational speed of the blower increases. This is because the air of the boundary layer is affected more from the indoor air so far as the air quantity of the blower becomes larger.

The weighted value x has different values according to the emitting mode of the air conditioner, and it has bigger value in case of the floor mode FLR, the mixed mode MIX, and the defrost mode DEF than that of the vent mode VENT or the by-level mode B/L. This is to prevent the value of the combination temperature from excessively following the indoor temperature, when the air is discharged through the defrost duct.

The weighted value x has different values according to the temperature difference between the indoor and the outdoor, and increases as the temperature difference between the indoor and the outdoor increases. This is because the surface temperature has a greater effect in the presence of fog as the difference between the indoor temperature and the outdoor temperature increases.

Table 1 shows an example of the weighted values determined according to the air conditioning factors.

That is, the weighted value x has different values according to the speed of the automotive vehicle, and is set above 0.5 for high speed driving and below 0.5 for low speed driving. This is because the air state of the boundary layer of the glass surface is affected by the outside air to thereby show the air state of the glass surface side in case of driving at high speed.

TABLE 1

| Factor | State | Additive Value (x) | References |
|---|---|---|---|
| Automotive vehicle speed (x1) | High speed (over 60 km/hr) | x > 0.5 | The air state in the boundary of the glass surface follows the surface state in case of the high speed |
| | Mid speed (10~60 km/hr) | x = 0.5 | |
| | Low speed (below 10 km/hr) | x < 0.5 | |
| Air quantity of the blower (x2) | High speed (7~8 grade) | x < 0.5 | Air in the boundary layer shows the tendency of the indoor air state, if the air quantity increases |
| | Mid speed (4~6 grade) | x = 0 | |
| | Low speed (1~3 grade) | x > 0.5 | |
| Discharging mode of air conditioning (x3) | VENT, B/L | x = 0 | Amend the distortion of the combination temperature's following the indoor temperature excessively at the time of discharging DEF |
| | FLR, MIX, DEF | x > 0.5 | |
| Temperature difference between the indoor and the outdoor (x4) | Big (over 10° C.) | x > 0.5 | Weighted value is further given to the surface temperature so far as the indoor temperature is higher than the outdoor temperature |
| | Mid (5~10° C.) | x = 0 | |
| | Small (below 5° C.) | x < 0.5 | |

Further, the weighted value x has different values according to the air quantity of the blower. The value of x is set to be above 0.5 when the rotational speed of the blower is high (for example, 7~8 grade when the rotational speed of the blower is set to be controlled from 1 grade to 8 grade) and to be below 0.5 when the rotational speed is low (for example, 1~3 grade when the rotational speed of the blower is set to be controlled from 1 grade to 8 grade. This is because the air of the boundary layer is affected more by the indoor air than the outdoor air, so far as the air quantity of the blower increases. As a result, it is possible to obtain the proper combination temperature Tc, when the peripheral temperature Te is given much more weight.

In addition, the weighted value x has different values according to the discharging mode of the air conditioner. The value of x is set to be 0.5 in case of the vent mode VENT or the by-level mode B/L, but is set to be above 0.5 in case of the floor mode FLR, the mixed mode MIX, and the defrost mode DEF. The air in the boundary layer is very affected by the air discharged through the defrost duct in case of the defrost mode, however, the distortion becomes to be amended by increasing the weighted value x because the combination temperature can excessively follow the indoor temperature if the weighted value x is set to be 0.5.

Furthermore, the weighted value x has different values according to the temperature difference between the indoor and the outdoor. The value of x is large if the temperature difference between the indoor and the outdoor is large. That is, the weighted value is large so that the surface temperature is given much more weight, when the indoor temperature is much higher than the outdoor temperature.

Of course, the above weighted values x are merely examples, and it is preferable to set the weighted values respectively by using experimental results and the like at the time of actually applying them.

Also, it is preferable for the weighted value x to be set to a mean value of the weighted values determined by the overall air conditioning factors. Accordingly, the actual applied weighted value x can be denoted by the following equation 2.

$$x = \frac{x1 + x2 + x3 + \cdots + xn}{n} \quad (2)$$

Where, n is the total number of the air conditioning factor, and x1~xn are individual weighted values of the respective air conditioning factors.

When the whole weighted value x is set according to equation 2, the combined temperature Tc is calculated by using the weighted value x. Here, the combined temperature Tc can be denoted by equation 3 by using the individual weighted value of the respective determination factor.

$$Tc = \frac{x1 + x2 + x3 + \cdots + xn}{n} Ts + \left(1 - \frac{x1 + x2 + x3 + \cdots + xn}{n}\right) Te \quad (3)$$

When the calculation of the combination temperature Tc is completed by using the equation 1 or equation 3, volume of an absolute vapor volume is calculated by using the humidity H detected by the humidity sensor 12 and the combined temperature Tc. Then, when the calculation of the volume of the absolute vapor is completed, the dew point temperature Td is confirmed according to the volume of the absolute vapor. As a result, the dew point temperature Td can be calculated by using the surface temperature Ts, the peripheral temperature Te, and the humidity H.

In response to the surface temperature Ts being lower than the dew point temperature Td, the automotive vehicle defogging system 30 is operated. If Ts is not lower than Td, the automotive vehicle defogging system 30 is stopped, after comparing the dew point temperature Td with the surface temperature Ts. That is, because the vapor can be frozen to produce the fog when the surface temperature Ts is lower than the dew point temperature Td, the defogging system 30 is operated to supply warm air or cold air to the wind shield glass to thereby prevent the occurrence of fog. Of course, fog cannot occur, if the surface temperature Ts is higher than the dew point temperature Td. Therefore, the operation of the defogging system 30 is stopped to prevent a fuel efficiency decrease.

If the deviation between the dew point temperature Td and the surface temperature Ts is above a predetermined value ε, the defogging system 30 is operated. If the deviation of Td from Ts is not above E, the defogging system 30 is stopped. That is, the probability of the occurrence of the fog in the present air state is not only calculated in consideration of the existing surface temperature Ts and the peripheral temperature Te only, but the possibility of the occurrence of the fog is previously expected by considering the fluctuation transition of the combination temperature Tc by using the temperature incline of the peripheral temperature Te and the surface temperature Ts.

Figure 9:
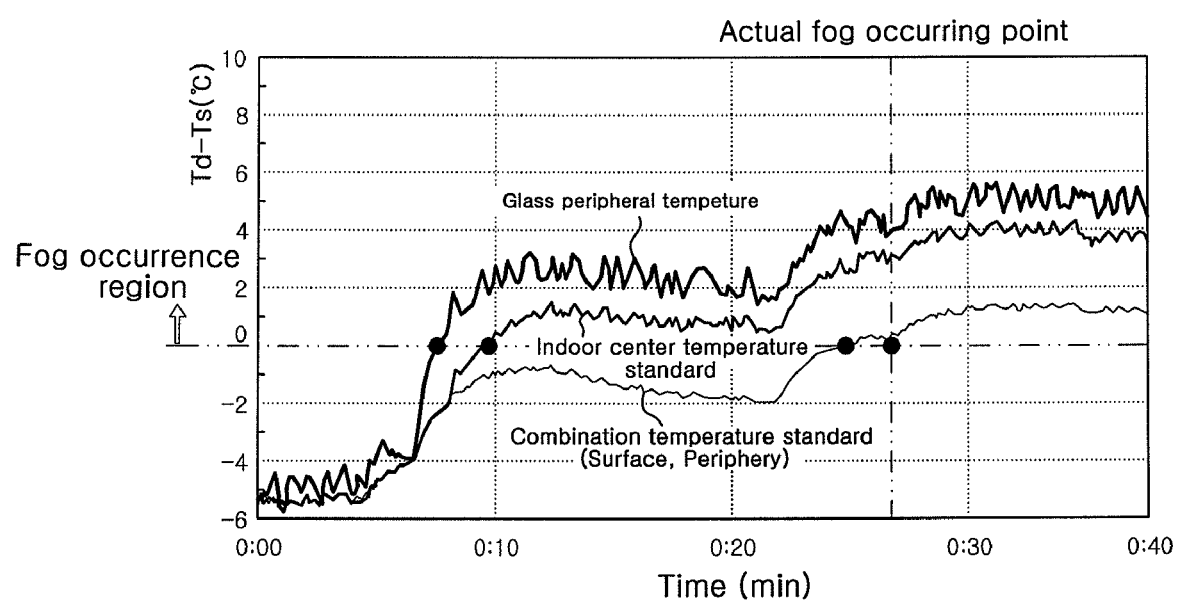
FIG. 9 includes graphs of the deviation of wind shield dew point temperature from windshield surface temperature versus time to indicate the expected occurrence time of fog.

FIG. 9 is a graph of expected fog occurrence time according to the respective temperature criteria. From FIG. 9, the expectation of the occurrence of the fog based on the combination temperature Tc is more analogous to the actual occurrence of the fog than the expectation of the occurrence of the fog based on the surface temperature Ts or the peripheral temperature Te.

That is, as a result of expecting the time of the occurrence of the fog on the basis of the combination temperature Tc, it is expected that the fog will occur after about twenty five minutes from the start-up of the automotive vehicle, so that it is possible to reduce the unnecessary operation time of the defogging system for about two minutes. Accordingly, the operation time of the defogging system for the automotive vehicle of the system described in connection with FIGS. 2–9 is reduced in comparison with the conventional manner, to thereby prevent the dissipation of the energy and to improve the fuel efficiency.

While the present invention has been described with reference to the particular illustrative embodiments, it is not to be restricted by the embodiments but only by the appended claims. It is also to be appreciated that those skilled in the art can change or modify the embodiments without departing from the scope and spirit of the present invention.

As described above, according to the defogging system for the automotive vehicle and the method for controlling the same of the present invention, it is possible to operate the defogging system 30 for the automotive vehicle as if the fog actually occurs, because the dew point temperature Td around the wind shield glass is calculated according to the driving condition and the air conditioning condition of the automotive vehicle, to thereby prevent the dissipation of the energy required to excessively operate the defogging system 30 for the automotive vehicle.

What is claimed is:

1. A system for detecting fogging of a glass windshield of an automotive vehicle comprising:
    a surface temperature sensor adapted to be mounted at a glass windshield of an automotive vehicle for detecting the glass surface temperature, Ts;
    a humidity sensor adapted to be mounted at a position spaced from the glass windshield by a predetermined distance for detecting the humidity H around the windshield glass;
    a peripheral temperature sensor adapted to be mounted inside of the windshield glass for detecting the peripheral temperature, Te, around the glass; and
    a signal deriving device for deriving (a) a first signal indicative of windshield dew point, Td, in response to indications of H and Tc, where Tc has a value adapted to be determined by an arrangement arranged to be responsive to combined values of Ts and Te,; and (b) a second signal indicative of the presence or absence of fog on the windshield, the second signal having a value adapted to be determined by an arrangement for comparing Td with Ts.

2. The system of claim 1, wherein the peripheral temperature sensor is mounted at the outside of a boundary layer directly affecting the occurrence of the fog when the fogging occurs at the windshield glass.

3. The system of claim 1, wherein the peripheral temperature sensor is mounted within the range of 4–15 mm from an interior surface of the windshield glass.

4. The system of claim 1, wherein the surface temperature sensor includes a protective cover including thermal insulation material that envelopes the sensor to substantially exclude the effect of the indoor temperature of the automotive vehicle from the temperature sensed by the surface temperature sensor.

5. The system of claim 1, wherein the humidity sensor is mounted at a position spaced by 4–15 mm from a surface of the windshield glass.

6. The system of claim 1, further including a vent cover having a plurality of holes enveloping the humidity sensor.

7. The system of claim 1, further including a single case mounted at a predetermined place on an inner surface of the windshield glass, the single case including the surface temperature sensor, the humidity sensor, and the peripheral temperature sensor.

8. The system of claim 1, further including a single PCB on which the surface temperature sensor, the humidity sensor, and the peripheral temperature sensor are mounted, the PCB including a connector for enabling the temperature sensors and the humidity sensor to be connected to the signal deriving device, and the surface temperature sensor being mounted close to a silicon pad attached to a glass surface of the windshield glass of an automotive vehicle.

9. The system of claim 1 in combination with a blower for selectively blowing air across the interior surface of the glass, the blower being connected to be responsive to the signal indicative of the presence or absence of fog on the windshield.

10. A method of detecting fog on windshield glass comprising:
    detecting surface temperatures, Ts, of the windshield glass and temperature Te of a peripheral windshield glass position spaced a predetermined distance from the windshield glass;
    detecting humidity H of the windshield glass by monitoring humidity close to the windshield glass;
    deriving a combination temperature Tc by combining values determined by Ts and Te;
    calculating a dew point temperature Td on the basis of H and Tc; and
    deriving an indication of the presence of fog on the windshield in response to a comparison of Ts and Td.

11. The method of claim 10 further including blowing defogging air across the windshield in response to the presence of fog being indicated, and stopping the air blowing step in response to the presence of fog not being indicated.

12. The method of claim 10, wherein the combination temperature Tc is determined by Tc=xTs+(1−x)Te, where x is a weighting value related to the surface temperature Ts and the peripheral temperature Te according to the driving condition and the condition of an air conditioner of the automotive vehicle.

13. The method of claim 12, wherein the weighting value x is determined by the mean value of individual weighting values determined by speed of the automotive vehicle, air quantity of a blower, discharging mode of an air conditioner of the vehicle, and temperature difference between the indoor and the outdoor of the automotive vehicle.

14. The method of claim 12, wherein the weighting value x has different values according to the speed of the automotive vehicle, and increases as the automotive vehicle speed increases.

15. The method of controlling the fogging detecting system according to claim 12, wherein the weighting value has different values according to the air quantity of a blower, and decreases as the rotational speed of the blower increases.

16. The method of claim 12, wherein the weighting value has different values according to a discharging mode of the air conditioner, and the weighting values of a floor mode FLR, a mixed mode MIX, and a defrost mode DEF are larger than those of a vent mode VENT or a bi-level mode B/L.

17. The method of claim 12, wherein the weighting value increases as the temperature difference between the interior and exterior of the windshield increases.

18. The method of claim 11, wherein the air is blown if the deviation between the dew point temperature $T_d$ and the surface temperature $T_s$ is above a predetermined value $\epsilon$, and if not, the air is not blown.

19. The method of claim 10, wherein the dew point temperature $T_d$ is determined according to the volume of absolute vapor which is calculated by using H and Tc.

* * * * *